United States Patent [19]

Lin

[11] Patent Number: 5,351,713
[45] Date of Patent: Oct. 4, 1994

[54] EFFECT-ENHANCING STRUCTURE FOR RINSING A FLUSH TOILET

[75] Inventor: Kuan-Yuh Lin, Miao Li Hsien, Taiwan

[73] Assignee: Chen Ying Ceramic Co., Ltd., Miao Li Hsien, Taiwan

[21] Appl. No.: 51,069

[22] Filed: Apr. 13, 1993

[51] Int. Cl.⁵ .................. F16K 31/24; F16K 33/00
[52] U.S. Cl. ........................ 137/410; 4/331; 4/366; 4/415; 137/423; 137/426; 137/434; 137/445
[58] Field of Search ............ 137/411, 423, 426, 434, 137/445, 391, 410; 4/300, 321, 331, 366, 415

[56] References Cited

U.S. PATENT DOCUMENTS

| | | | |
|---|---|---|---|
| 1,555,082 | 9/1925 | Serrell | 137/411 |
| 1,657,658 | 1/1928 | Buford | 137/426 |
| 2,096,051 | 10/1937 | MacLean | 137/426 |
| 2,424,163 | 7/1947 | Hammer | 137/411 UX |
| 2,664,100 | 12/1953 | Oliverio | 137/445 |
| 2,734,524 | 2/1956 | Burriss | 137/426 |
| 2,847,025 | 8/1958 | Reitman | 137/426 |
| 3,038,491 | 6/1962 | Beazley | 137/426 |
| 4,175,296 | 11/1979 | Goldman | 137/423 |
| 4,266,304 | 5/1981 | Kohrn et al. | 137/423 |
| 4,318,194 | 3/1982 | Pinkston | 4/366 |
| 4,420,845 | 12/1983 | Antunez | 4/366 |
| 4,655,244 | 4/1987 | Park | 137/423 |
| 4,918,763 | 4/1990 | Brotcke | 4/366 |
| 4,980,932 | 1/1991 | Stemples | 4/415 |
| 4,996,726 | 3/1991 | Schrock et al. | 4/366 |

FOREIGN PATENT DOCUMENTS

| | | | |
|---|---|---|---|
| 15373 | 9/1903 | Fed. Rep. of Germany | 137/426 |
| 17344 | of 1894 | United Kingdom | 137/426 |
| 193994 | 3/1923 | United Kingdom | 137/426 |

Primary Examiner—George L. Walton
Attorney, Agent, or Firm—Pro-Techtor International

[57] ABSTRACT

An effect-enhancing structure for rinsing a flush toilet includes a plurality of sets of a water-supply device and a floating ball, a trunk duct conducting water into a water case, a distributing duct set transversely and connected to the trunk duct, stop valves connected to the distributing duct to provide a distribution of water supply, and water supply ducts; wherein the stop valves are connected to rods of the floating ball separately to control the switching so as to increase the hydraulic pressure of stored water.

9 Claims, 11 Drawing Sheets

EFFECT-ENHANCING STRUCTURE FOR RINSING A FLUSH TOILET

BACKGROUND OF THE INVENTION

Field of the Invention

The present invention relates to an effect-enhancing structure for rinsing a flush toilet including a plurality of sets of a water—supply device and a floating ball which can provide a high hydraulic pressure and then an effective rinse for a flush toilet combined with its water case as a body; besides, leverages and adjusting devices which can adjust the height of stored water to save the use of water.

Description of the Prior Art

The water case of a conventional flush toilet is set separately at a higher place, thereby give Water an enough fall for a clear rinse. But this will occupy a larger amount of space and make much noise. The water case of a toilet developed later is set at the same level as a body. Although this is not space-occupying and noisy, the fall is not enough for a clear rinse so that a lot of water will be wasted due to duplicate rinses. Moreover, the time for storing water afresh is long because of a single water-supply device.

SUMMARY OF THE INVENTION

It is a main object of the present invention to provide an effect-enhancing structure for rinsing a flush toilet, in which water can flush or enter in a large amount for an instant so that the noise is low and the rinse is effective.

It is another object of the present invention to provide an effect-enhancing structure for rinsing a flush toilet, which can adjust the height of stored water as required.

It is yet another object of the present invention to provide an effect-enhancing structure for rinsing a flush toilet, which has a delicate operation and a labor-saving press due to the design of a single fulcrum and curveness of the rod connected to the floating ball.

It is a still more object of the present invention to provide an effect-enhancing structure for rinsing a flush toilet, which is not reliable to break down due to the design of a single fulcrum of the rod connected to the floating ball and a contact joint between the adjusting devices.

It is a further object of the present invention to provide an effect-enhancing structure for rinsing a flush toilet having two or more floating-ball switches, which can be connected to different water-supply pipes or used for a concentrated water-supply system of a public comfort station with a plurality of flush toilets.

Moreover, the present invention has a combination of a water-supply device with a double petal valve and a double floating ball. The former can increase the amount of water supply and then shorten the time for storing water; the latter can provide a high hydraulic pressure and then an effective rinse.

The present invention also has a control valve and a hydraulic meter in the path of the water-supply device, which can control the amount and the pressure of stored water with effect.

Besides, there is designed an adjustable structure between the joint of the petal valve in the water-supply device and the rod connected to the floating ball for adjustments of the time for storing water and then the height of stored water.

A more complete understanding of these and other features and advantages of the present invention will become apparent from a careful consideration of the following detailed description of certain embodiments illustrated in the accompanying drawings.

DESCRIPTION OF THE PREFERRED EMBODIMENTS

Referring to the accompanying drawings, an effect-enhancing structure for rinsing a flush toilet includes a trunk duct 21 conducting water into a water case 1, a distributing duct 22 set transversely and connected to the trunk duct 21, stop valves 3 comprising a shell of the stop valve 31, a stop ring 32 and a stopper 33 which are connected to the distributing duct 22 to provide a distribution of water supply, a water-supply device comprising a leverage 4 having a plurality of fulcrums to control the switching of the stop valves 3, floating balls 5, linear rods 61 or curved rods 62 connected to the floating balls 5; wherein the fulcrums of the leverage 4 can be fixed to certain locations to set the amount of water supply for the water-supply device (as shown in FIGS. 1–4) or be adjusted by changing the size and the height of a cavity hole 42 on a support 41 through the use of single-headed or double-headed screws 431, 432, 433 and nuts 43 (as shown in FIGS. 5–10)

Figure 1:
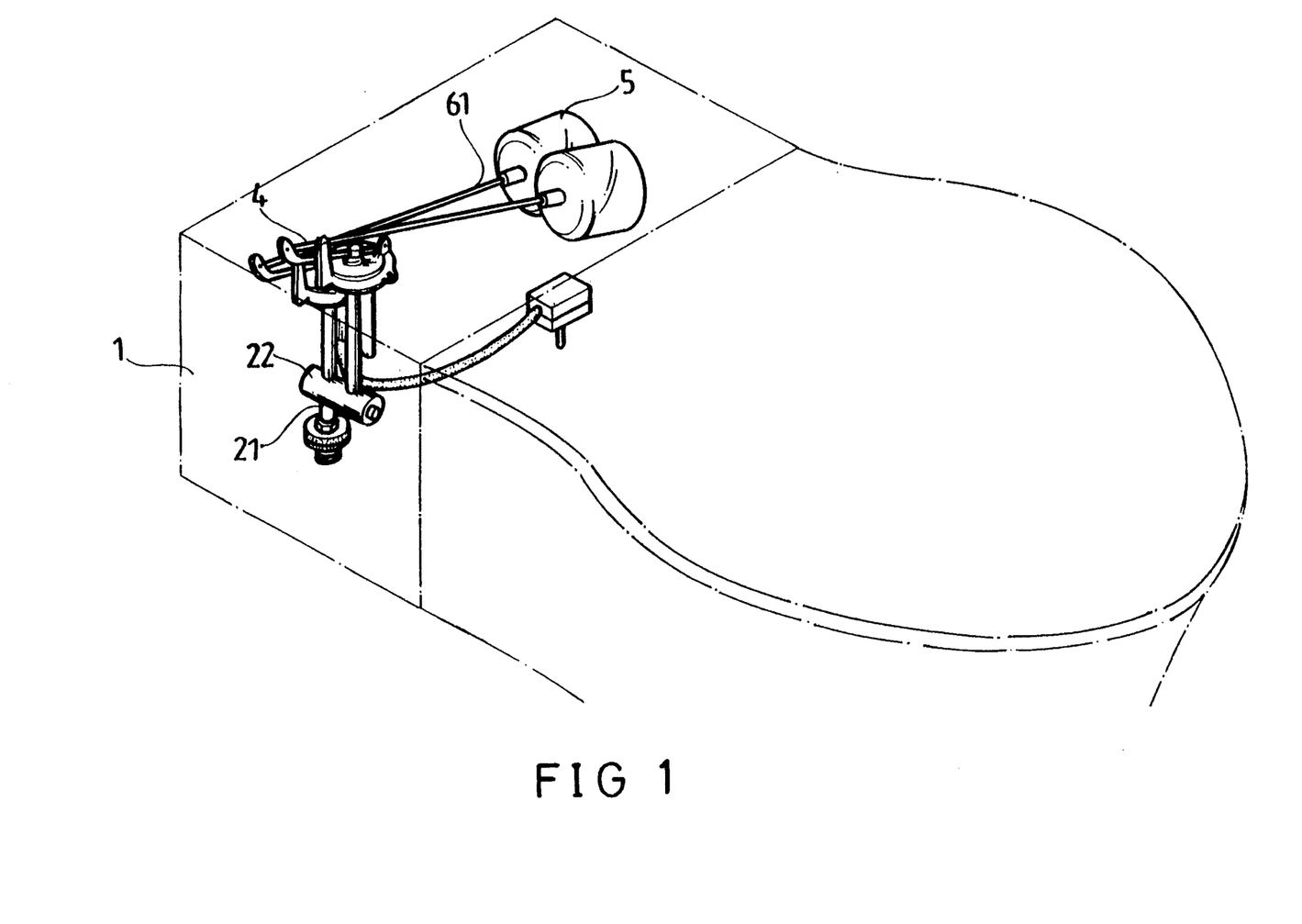
FIG. 1 is a schematic view of an embodiment of the present invention.
Figure 2:
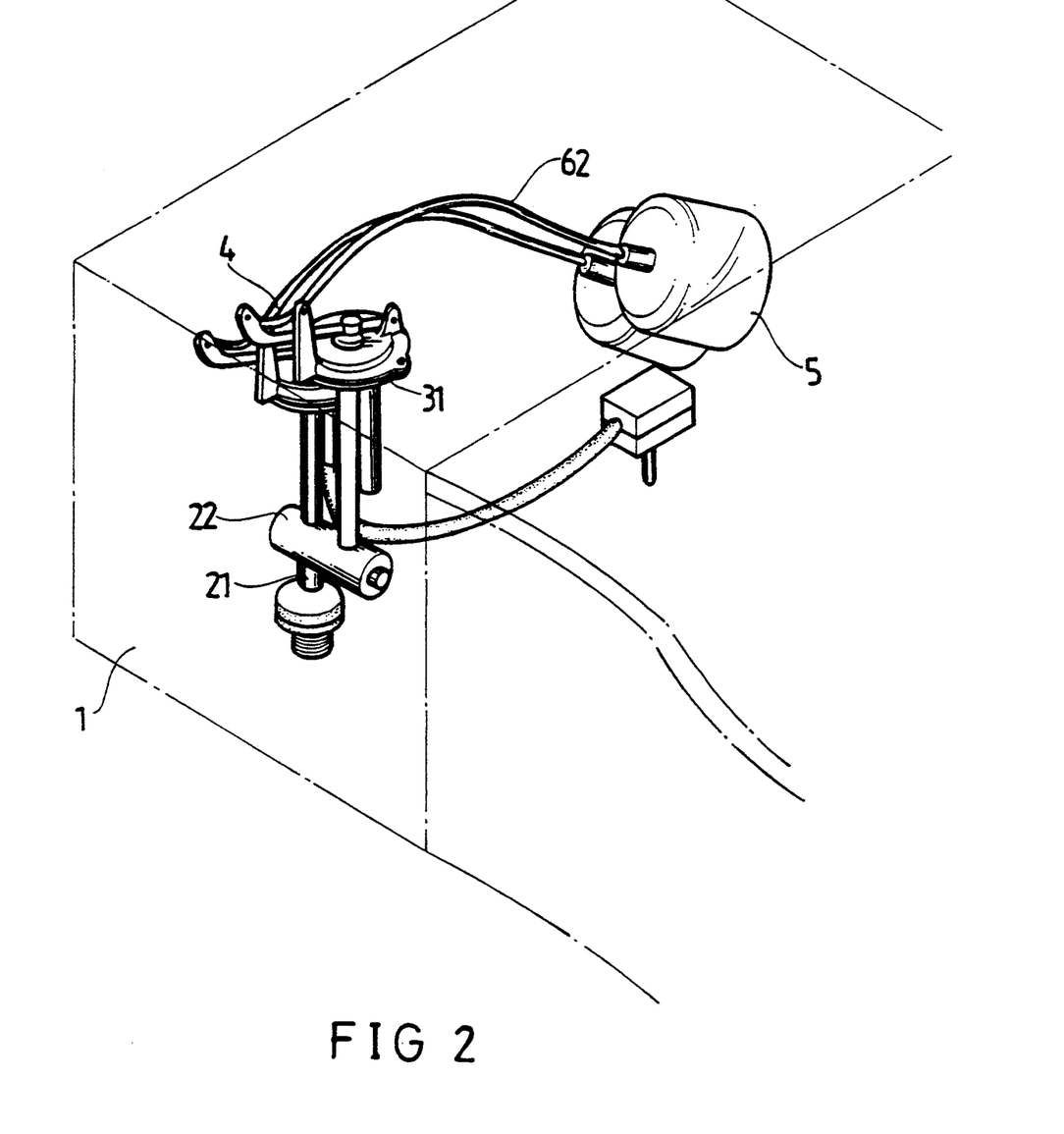
FIG. 2 is another schematic view of FIG. 1.
Figure 3:
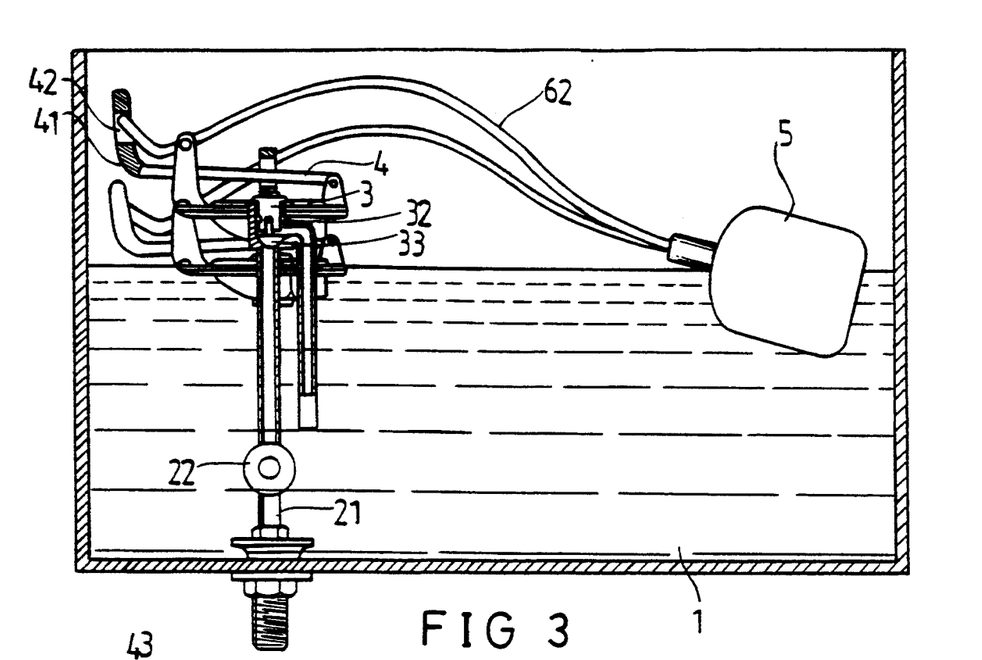
FIG. 3 is a cross-sectional view of FIG. 2.
Figure 4:
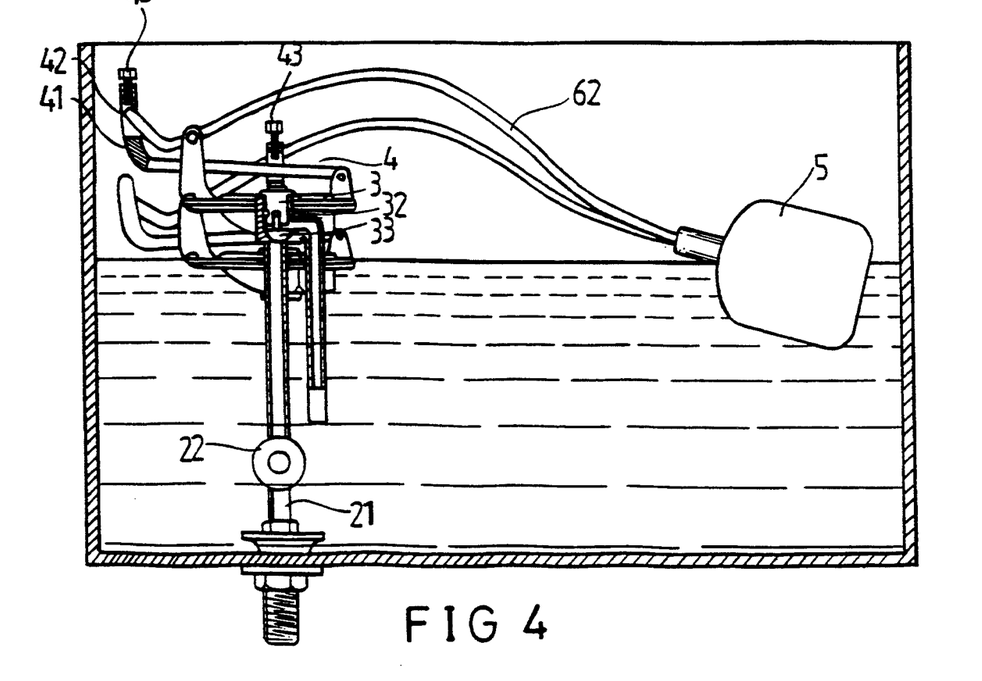
FIG. 4 is a schematic view of FIG. 3 with adjusting screws installed.
Figure 5:
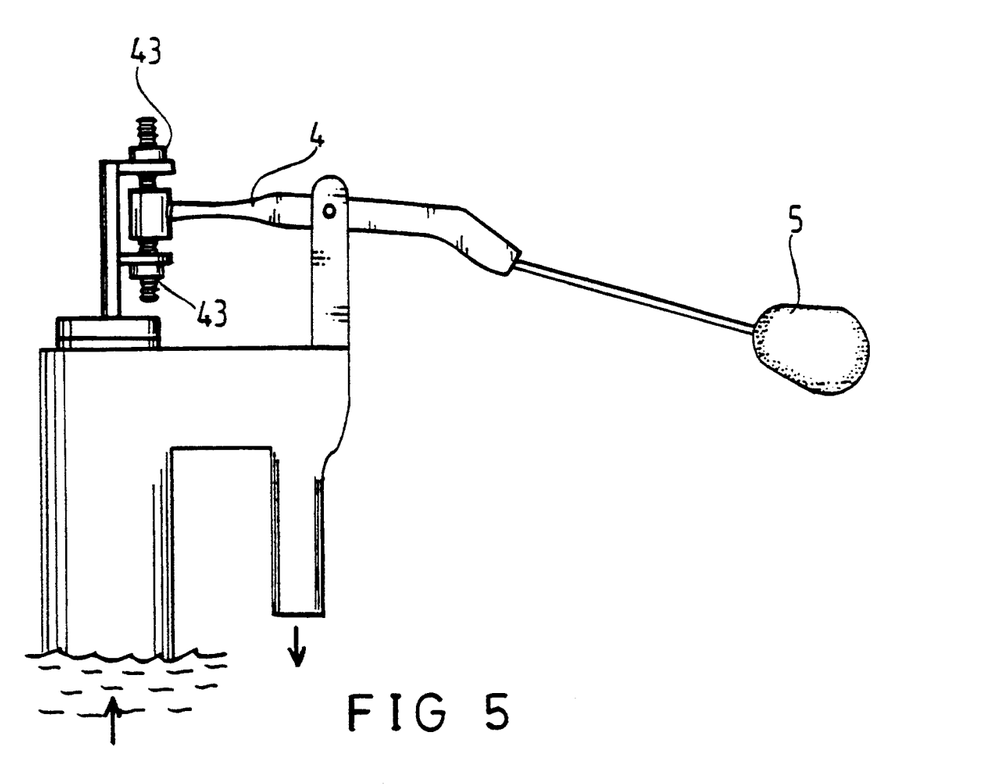
FIG. 5 is a schematic view of another embodiment of the present invention.
Figure 6:
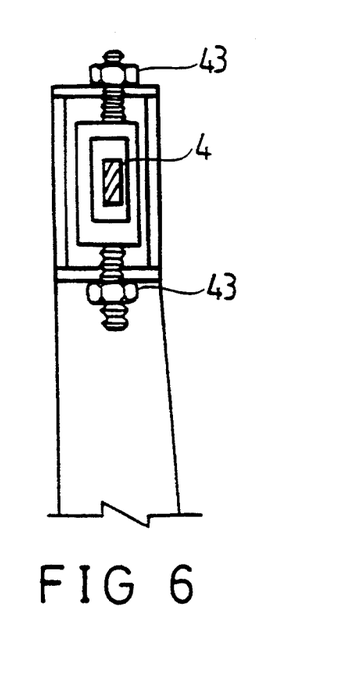
FIG. 6 is a cross-sectional view of the adjusting device in FIG. 5.
Figure 7:
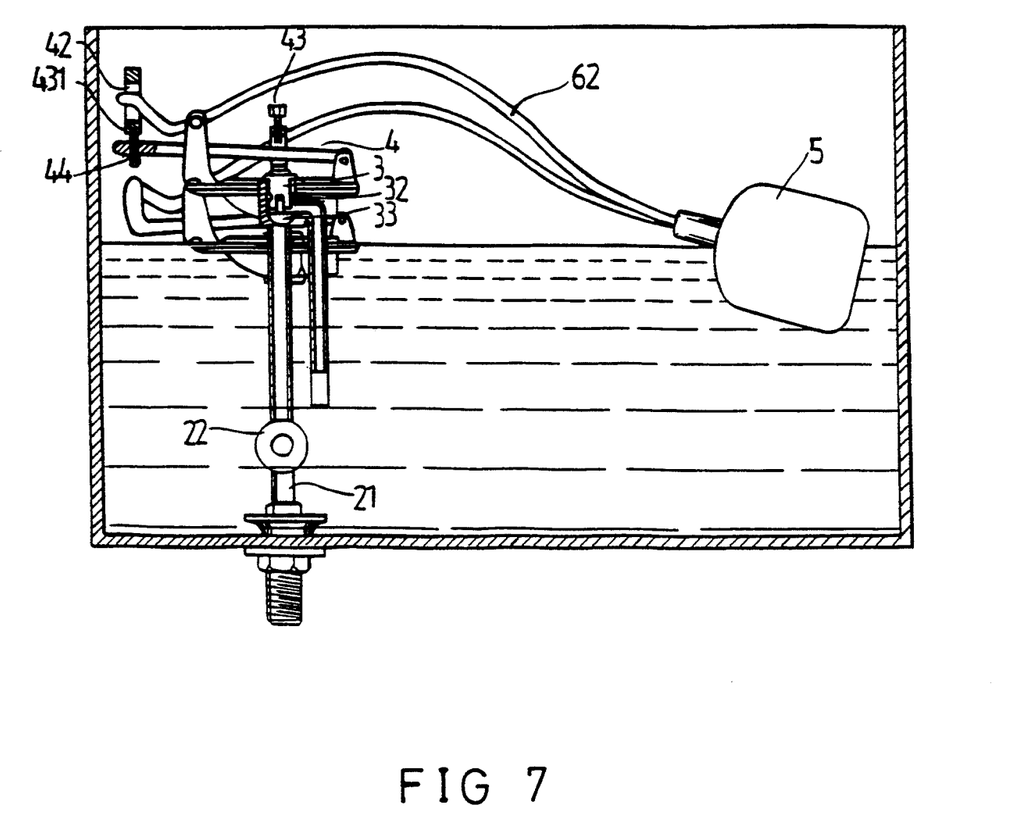
FIG. 7 is a schematic view of FIG. 3 with adjusting screws installed in a different way.

As shown in FIG. 7, the end of the leverage 4 is horizontal and a tapped hole 44 is set therein. The adjusting screw 431 having the cavity hole 42 is screwed into the tapped hole 44 to control the linear rod 61 or the curved rod 62 to adjust the amount of water supply.

Figure 8A:
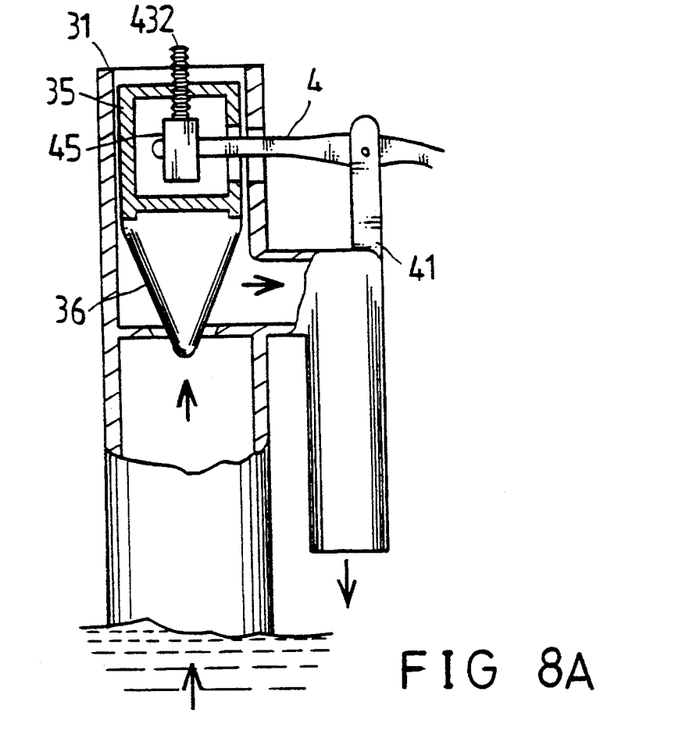
FIG. 8A is a schematic view of the third embodiment of the present invention.
Figure 8B:
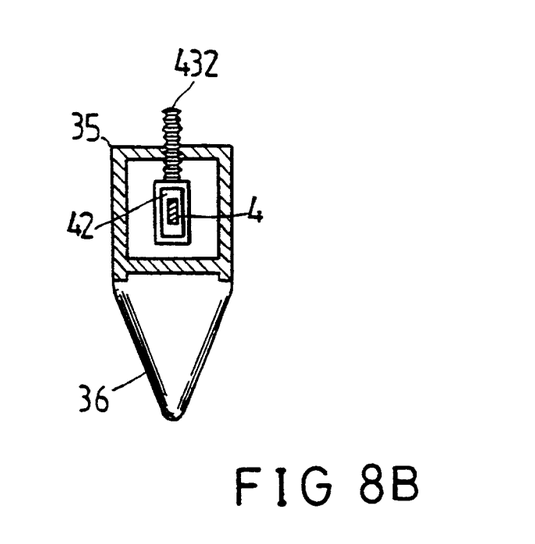
FIG. 8B is a cross-sectional view of the adjusting device in FIG. 8A.

As shown in FIGS. 8A and 8B, the end of the leverage 4 is put into the cavity hole 42 of an adjusting device 45 inside a stopper seat 35. The bottom of the stopper seat 35 is connected to a stopper head 36 to control the input of water supply, and they are wrapped in the shell of the stop valve 31. The adjusting screw 432 is penetrated through the shell of the stop valve 31 and the stopper seat 35; then connected to the adjusting device 45 to control the leverage 4 to adjust the amount of water supply.

Figure 9:
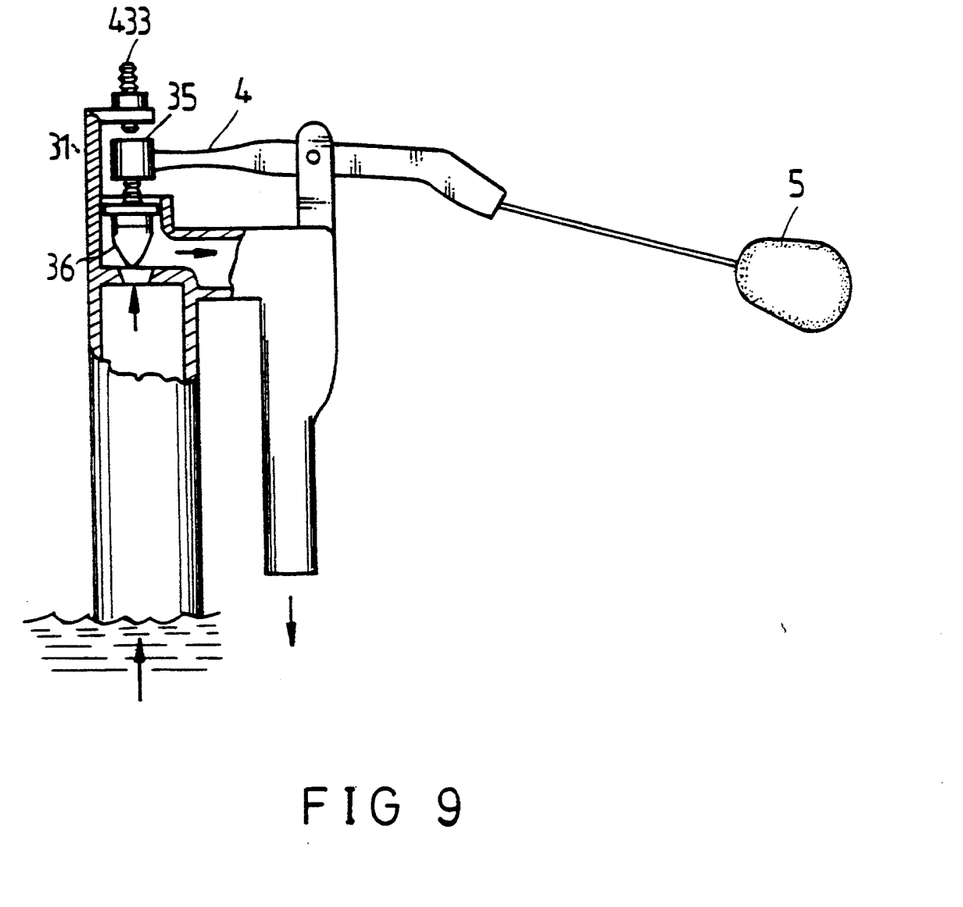
FIG. 9 is a schematic view of the fourth embodiment of the present invention.

As shown in FIG. 9, the stopper seat 35 is also controlled directly by the adjusting screw 433 to adjust the leverage 4 and the amount of water supply.

Figure 10:
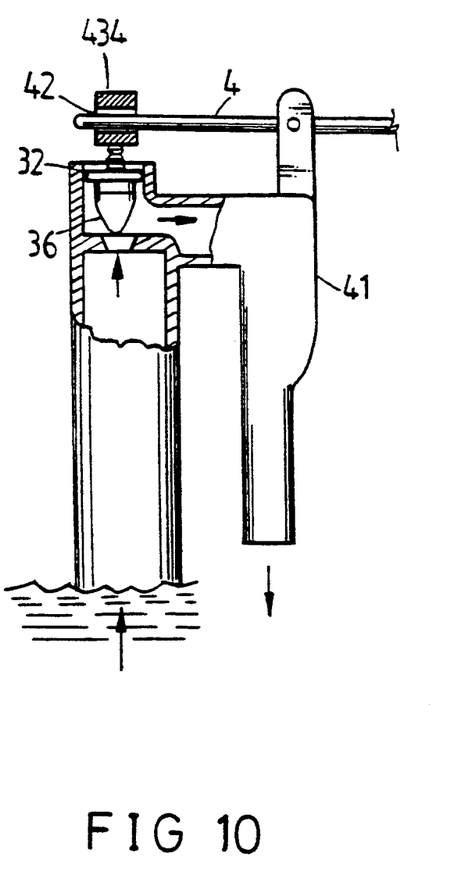
FIG. 10 is a schematic view of the fifth embodiment of the present invention.

As shown in FIG. 10, the stopper head 36 is encircled with the stop ring 32. An adjusting device 343 of another type has thread at the bottom for adjustment, and a cavity hole 42 at a proper place to insert the leverage 4 thereinto to adjust the amount of water supply.

Furthermore, there are two or more sets of a water supply device and a floating ball: one supplies water to the water case 1; the other to the upper rim of the flush toilet. The stop valves 3 are connected to the rods separately to independently control the water flow to each of the water-supply devices so as to increase the total amount of hydraulic pressure available.

Figure 11:
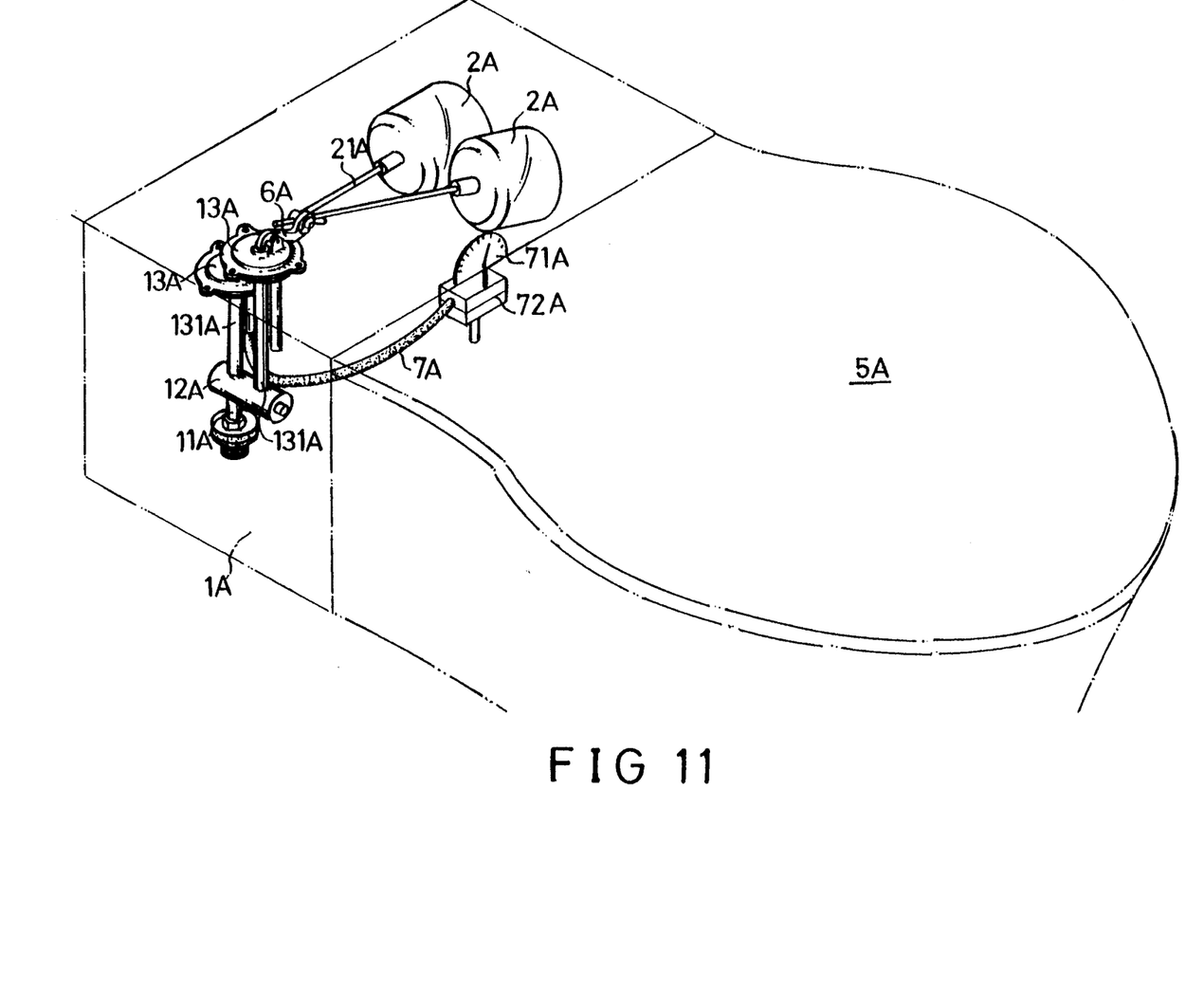
FIG. 11 is yet another schematic view of FIG. 1.

Referring to FIG. 11, an effect-enhancing structure for rinsing a flush toilet according to an embodiment of the present invention includes a double set of a water-supply device 1A and a floating ball 2A, a water case 3A, stored water 4A, a flush toilet 5A, a control valve 72A, and a hydraulic meter 71A; wherein the design of the double set of the water-supply device 1A and the floating ball 2A can provide a high hydraulic pressure for an effective rinse, besides, the control valve 72A and the hydraulic meter 71A in the path of the water-supply device 1A can control the amount and the pressure of stored water with effect.

Figure 12:
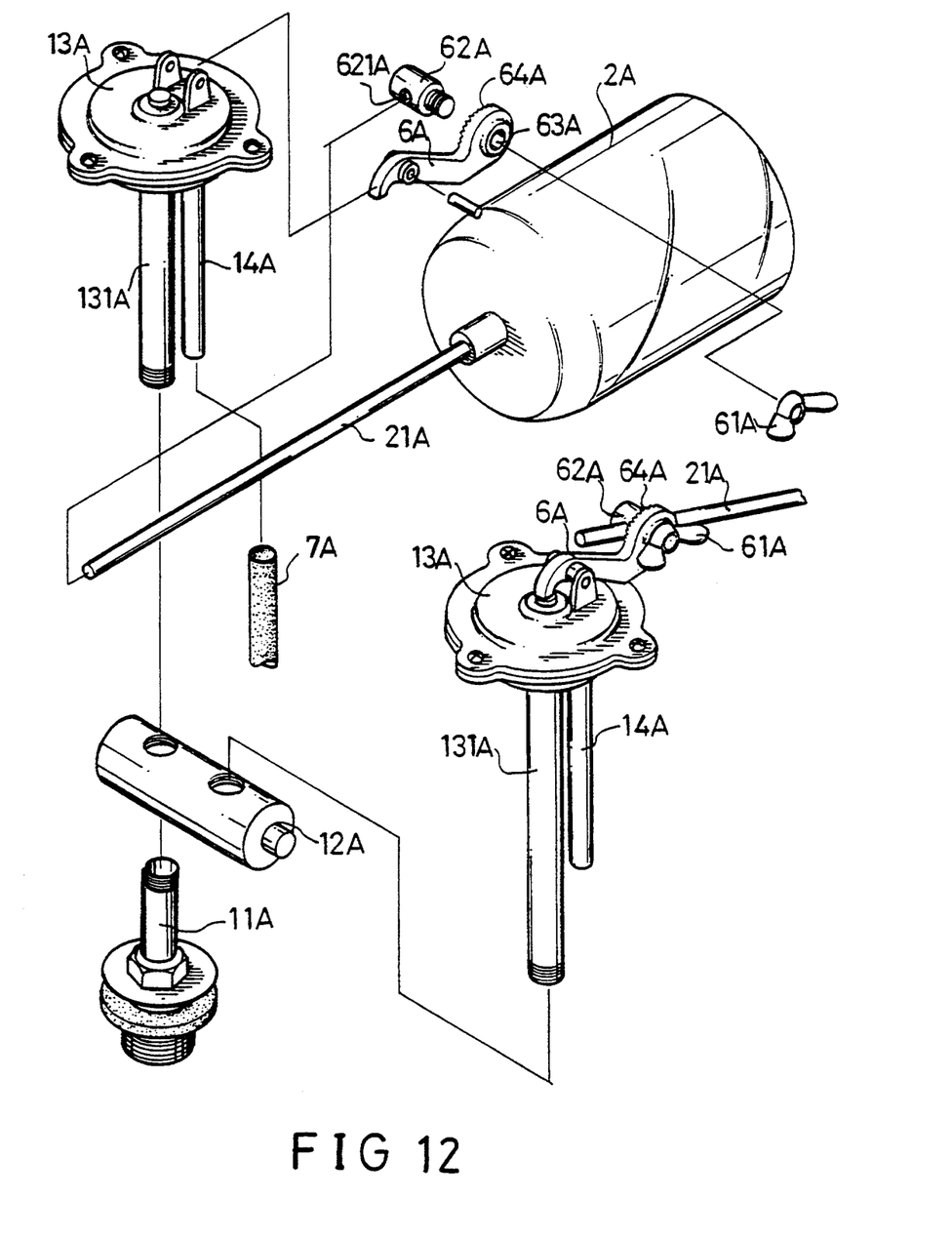
FIG. 12 is a separated view of FIG. 11.

Referring to FIG. 12, the water-supply device 1A includes a trunk duct 11A, a distributing duct 12A, two petal valves 13A and two water-supply duct 14A. The trunk duct 11A is used to conduct water into the water case 3A; and the distributing duct 12A set transversely is connected to the trunk duct 11A and lower connecting ducts 131A of the two petal valves 13A to distribute water into two branches. The construction of the petal valves 13A and water-supply ducts 14A are conventional and will not be repeated here.

A joint 6A is formed on the top of each petal valve 13A to connect to the rod 21A of floating ball 2A. The joint 6A has a screw hole 63A which a screw bolt 62A can penetrate to fix by a nut of butterfly-shape 61A on the other side of the joint 6A; the screw bolt 62A has a pass hole 621A for the rod 21A to penetrate; and as a result the rod 21A of the floating ball 2A is fixed on the joint 6A. Moreover, the outer rim of the screw hole 63A has convex teeth 64A to increase the friction force between the rod 21A and the joint 6A to prevent sliding. The distance between the floating ball 2A and the petal valve 13A can be varied by moving the rod 21A back and forth to adjust the time for storing water and then the height of stored water 4A. Adjusting the effective length of the rod 21A changes he trigger point of the petal valve 13A, so that the water level 4A is raised or lowered as the rod 21A is lengthened or shortened respectively.

The bottom of one of the water-supply ducts 14A connected to a connecting duct 7A, which stretches to reach the control valve 72A and the hydraulic meter 71A near the upper rim of the flush toilet 5A; the control valve 72A and the hydraulic meter 71A can separately adjust the amount and the pressure of stored water 4A under the human control.

Figure 13:
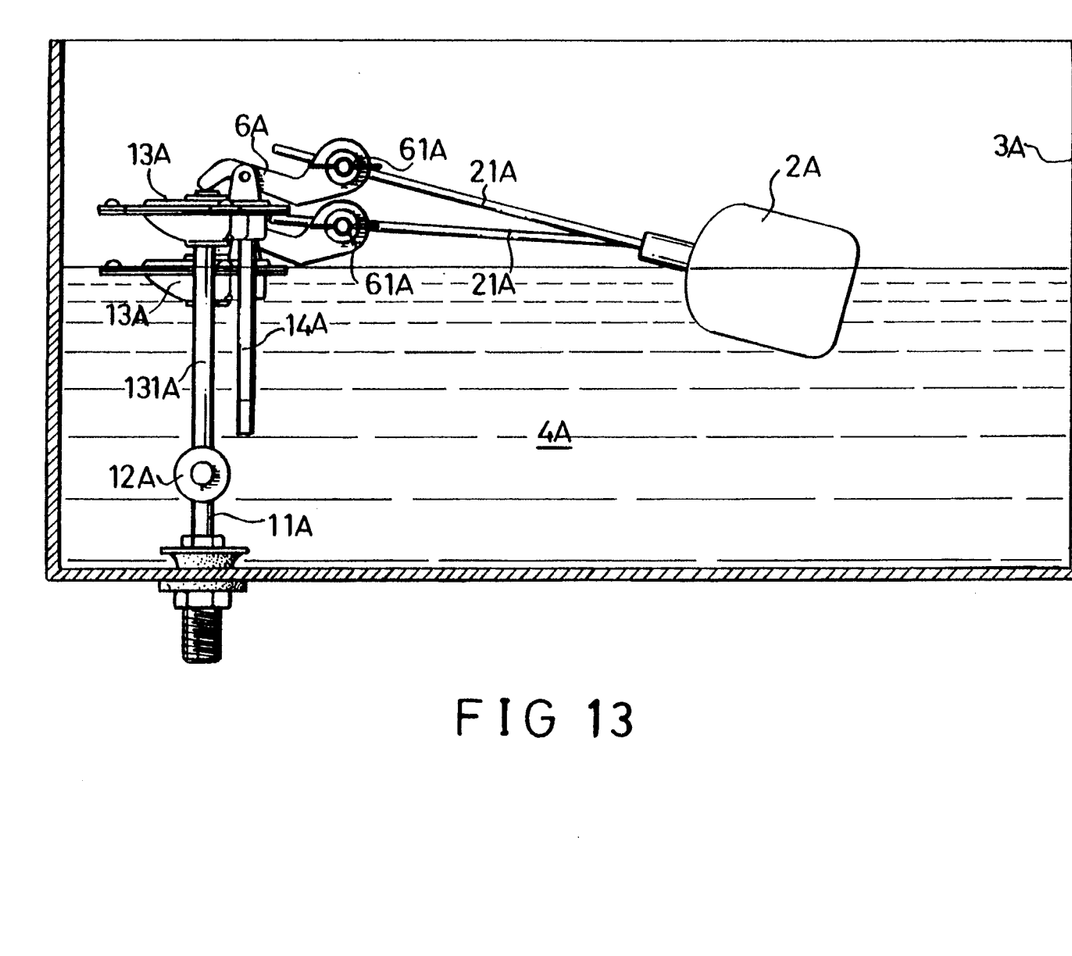
FIG. 13 is a combinational view of FIG. 11.

Referring to FIG. 13, two sets of a water-supply device and floating ball can doubly increase the amount of water supply and then shorten the time for storing water; and the design of the double floating ball provides a pressurized water supply to provide an effective rinse.

Accordingly, a conventional flush toilet combined with its water case as a body has been greatly improved. The present invention has been described with reference to the preferred embodiments. As will be evident to those skilled in the art, however, various modifications of this invention can be made or followed in the light of the foregoing disclosure without departing from the spirit and scope of the claims.

I claim:

1. An effect enhancing structure for rinsing a flush toilet comprising:
    at least two water-supply devices, each including a floating ball;
    a trunk duct through which water flows into a water case;
    a distributing duct disposed and connected transversely between said trunk duct and said water supply devices to distribute inlet water to the water-supply devices;
    said water supply devices including at least one stop valve connected to said distributing duct to control water supply to said water supply devices, said stop valves each being operatively connected to a first end of float actuating rods, a second end of the float actuating rods being attached to floating balls so that each water supply device operates independently of each other according to the difference in the water level heights that affect each water;
    wherein water pressure is restored much more quickly following a use, and the overall water pressure is increased to provide a more effective rinse to the flush toilet by the provision of an outlet duct associated with each water-supply device, thus enabling multiple outlet ducts to thereby permit a control increase in the amount of stored water supply over a shorter period of time to the flush toilet.

2. An effect-enhancing structure for rinsing a flush toilet as claimed in claim 1 wherein:
    there are two sets of said water-supply device, each including a floating ball;
    a first water-supply set supplying water to said water case, and a second water-supply set supplying water to an upper rim of the flush toilet.

3. An effect-enhancing structure for rinsing a flush toilet as claimed in claim 1 wherein:
    one of said water-supply sets communicates with a control valve and a hydraulic meter via a connecting duct.

4. An effect-enhancing structure for rinsing a flush toilet as claimed in claim 1 wherein:
    said water supply device include a lever with an adjustable fulcrum point to control the switching of said stop valves, said switching determining the amount of water contained in the water case.

5. An effect-enhancing structure for rinsing a flush toilet as claimed in claim 4 wherein:
    said lever is adjusted by changing the size and height of a cavity hole on a support.

6. An effect-enhancing structure for rinsing a flush toilet as claimed in claim 5 wherein:
    the size and height of said cavity hole on said support are adjusted by changing the location of adjusting screws and nuts.

7. An effect-enhancing structure for rinsing a flush toilet as claimed in claim 6 wherein:
    said adjusting screws and nuts have double-headed combinations.

8. An effect-enhancing structure for rinsing a flush toilet as claimed in claim 1 wherein:
said stop valves including a shell, a stop ring, and a stopper.

9. An effect-enhancing structure for rinsing a flush toilet as claimed in claim 1 wherein:
an end of said rod has a tapped hole, and an adjusting screw hole is screwed into said tapped hole, said adjusting screw being moved up or down to provide adjustment means for the amount of water allowed to flow into the water case, said adjusting screw changing the angle of the rod relative to the surface of the water in the water case, causing a trigger point of the stop valve to be altered.

* * * * *